United States Patent
Zhang

(10) Patent No.: US 12,228,890 B2
(45) Date of Patent: Feb. 18, 2025

(54) METHOD AND APPARATUS FOR PRECISE CONTROL OF POSITION OF SERVO MOTOR BASED ON SPACE-TIME TWO-DIMENSIONAL OPTIMIZATION

(71) Applicant: Guangdong Polytechnic Normal University, Guangzhou (CN)

(72) Inventor: Bitao Zhang, Guangzhou (CN)

(73) Assignee: Guangdong Polytechnic Normal University, Guangzhou (CN)

( * ) Notice: Subject to any disclaimer, the term of this patent is extended or adjusted under 35 U.S.C. 154(b) by 0 days.

(21) Appl. No.: 18/605,523

(22) Filed: Mar. 14, 2024

(65) Prior Publication Data

US 2025/0004427 A1    Jan. 2, 2025

(30) Foreign Application Priority Data

Jun. 27, 2023   (CN) .......................... 202310761407.5

(51) Int. Cl.
G05B 11/42    (2006.01)
(52) U.S. Cl.
CPC .................... G05B 11/42 (2013.01)
(58) Field of Classification Search
CPC ........................................................ G05B 11/42
See application file for complete search history.

(56) References Cited

U.S. PATENT DOCUMENTS

| | | | |
|---|---|---|---|
| 11,652,435 B2 * | 5/2023 | Lan | H02P 7/2985 |
| | | | 310/95 |
| 2017/0153614 A1 * | 6/2017 | Namie | G05B 13/0265 |
| 2018/0267486 A1 * | 9/2018 | Manabe | G05B 13/048 |
| 2018/0335758 A1 * | 11/2018 | Shinoda | G06N 20/00 |
| 2021/0367547 A1 * | 11/2021 | Lan | G05B 11/36 |

FOREIGN PATENT DOCUMENTS

| | | |
|---|---|---|
| CN | 105404157 A | 3/2016 |
| CN | 108931918 A | 12/2018 |
| CN | 112859612 A | 5/2021 |

* cited by examiner

*Primary Examiner* — Tameem D Siddiquee
(74) *Attorney, Agent, or Firm* — Nitin Kaushik

(57) ABSTRACT

The present invention relates to a method and apparatus for precise control of a position of a servo motor based on space-time two-dimensional optimization. The method includes the following steps: targeting either one of an angle or a displacement of the motor as a target value; obtaining a set value and a feedback value of the target value; based on the set value and the feedback value of the target value, performing processing by a control algorithm integrating a time dimension and a space dimension to obtain an output of the target value at a time t in a k dimension; and performing corresponding control on the motor based on the output of the target value at the time t in the k dimension.

5 Claims, 5 Drawing Sheets

METHOD AND APPARATUS FOR PRECISE CONTROL OF POSITION OF SERVO MOTOR BASED ON SPACE-TIME TWO-DIMENSIONAL OPTIMIZATION

CROSS-REFERENCE TO RELATED APPLICATIONS

The application claims priority to Chinese patent application No. 2023107614075, filed on Jun. 27, 2023, the entire contents of which are incorporated herein by reference.

TECHNICAL FIELD

The present invention relates to the technical field of motor control, in particular to a method and apparatus for precise control of a position of a servo motor based on space-time two-dimensional optimization.

BACKGROUND

In the prior art, control of a servo motor is generally divided into two parts, namely speed control and position control. The speed control refers to accurate control of the rotation speed of the motor by controlling input voltage of the servo motor; and the position control refers to accurate control of a position of the motor realized by feedback control on the position of the motor based on the speed control.

A PID control algorithm is a classic servo motor control algorithm that can achieve control of the motor. Currently, more than 90% of servo motor control algorithms on the market still use the PID control algorithm as shown in FIG. 3:

a principle of the PID algorithm is as follows:

$$u(t) = Kp * \text{error}(t) + Ki * \int_0^t \text{error}(t)dt + Kd * d[\text{error}(t)]/dt,$$

where Pr(t) and P(t) represent set and feedback positions or angles at a time t, respectively; error(t)/e(t) is a current following error at the time t; u(t) is an output of a PID controller at the time t; and Kp, Ki, and Kd represent parameters of the PID controller.

However, the classic PID algorithm only optimizes control performance of the motor based on a time dimension, that is, design of the control algorithm is basically based on the following error e(t) at the time t, which has shortcomings of low optimization efficiency and low performance.

SUMMARY

In order to at least solve one of the defects in the prior art, the present invention provides a method and apparatus for precise control of a position of a servo motor based on space-time two-dimensional optimization.

In order to realize the purpose, the present invention adopts the following technical solution:

specifically, a method for precise control of a position of a servo motor based on space-time two-dimensional optimization is proposed, which includes the following steps:

targeting either one of an angle or a displacement of the motor as a target value;

obtaining a set value and a feedback value of the target value;

based on the set value and the feedback value of the target value, performing processing by a control algorithm integrating a time dimension and a space dimension to obtain an output of the target value at a time t in a k dimension; and performing corresponding control on the motor based on the output of the target value at the time t in the k dimension.

Further, specifically, based on the set value and the feedback value of the target value, performing processing by a control algorithm integrating a time dimension and a space dimension to obtain an output of the target value at a time t in a k dimension includes:

performing processing by the control algorithm in the time dimension, including:

defining e(t) as a following error of the target value, $$e(t) = Pr(t) - P(t) \tag{1}$$

where Pr(t) is the set value of the target value, and P(t) is the feedback value of the target value;

calculating a control rate $r_k(t)$ at the time t in the k dimension based on the following error e(t) of the target value and a state deviation $\delta(x_k(t))$ of the target value at the t time in the k dimension and a k−1 dimension, $$r_k(t) = \begin{pmatrix} k_1 & k_2 \end{pmatrix} \begin{pmatrix} \delta(x_k(t)) \\ e(t) \end{pmatrix}, \tag{2}$$

where a control rate gain is defined by a two-dimensional matrix $K_p = (k_1, k_2)$, $$\delta(x_k(t)) = x_k(t) - x_{k-1}(t) \tag{3}$$

$x_k(t)$ is a state of the target value at the time t in the k dimension, and $x_{k-1}(t)$ is a state of the target value at the time t in the k−1 dimension, which are read by a memory, and the memory is used for storing a state value and an output value of the previous dimension;

performing processing by the control algorithm in the space dimension, including:

calculating an output $u_k(t)$ of a controller at the time t in the k dimension;

$$u_k(t) = u_{k-1}(t) + r_k(t) \tag{4}$$

where $u_{k-1}(t)$ is an output of the controller at the time t in the k−1 dimension, and is read by the memory, inputting $u_k(t)$ into a motor mechanism model $\Sigma_s$ to obtain an output $P_k(t)$ of the target value at the time t in the k dimension, $$\sum_s : \begin{cases} x_k(t) = (A + \Delta A(t))x_k(t) + (B + \Delta B(t))u_k(t) + d(t) \\ P_k(t) = Cx_k(t), 0 \le t \le T_p, k = 1, 2, 3, \ldots n \end{cases},$$

where A, B, and C are electrical coefficients of the motor, and can be obtained by measuring or consulting a motor manual, and $\Delta A(t)$ and $\Delta B(t)$ are changes in the electrical coefficients of the motor; d(t) is an external disturbance; and $T_p$ represents an operating cycle time of the motor in the space dimension, by using the simultaneous equations (1)-(4), an output $u_k(t)$ of the controller of the motor can be calculated, and the target value of the motor can be controlled to quickly follow the set value.

Further, specifically, an operating time $T_p$ of the motor in a periodic direction is determined as follows:

firstly, defining $T_p$ as a time required for the motor to operate by one circle, namely 360 degrees or $2\pi$, where the following relationship exists:

$$2\pi = \int_0^{T_p} v_k(t)dt,$$

where $v_k(t)$ represents an operating speed of the motor, and therefore, $T_p$ can be calculated.

Further, specifically, a control rate gain parameter Kp is determined as follows:
according to the following matrix inequality equation:

$$\begin{pmatrix} -Q(\tau, \theta) & (AQ+BJ)^T & (H_1Q)^T & (H_2J)^T & (CQ)^T & 0 \\ AQ+BJ & -Q+\sigma_1 G_1 G_1^T + \sigma_2 G_2 G_2^T & 0 & 0 & 0 & d \\ H_1Q & 0 & -\sigma_1 I & 0 & 0 & 0 \\ & H_2J & 0 & 0 & -\sigma_2 I & 0 & 0 \\ & CQ & 0 & 0 & 0 & -\gamma I & 0 \\ & 0 & d^T & 0 & 0 & 0 & -\gamma I \end{pmatrix} < 0, \quad (5)$$

in the equation, $d=d(t)$, $-Q(\tau, \theta) \triangleq \text{diag}\{\tau Q_b, \theta Q_r\} > 0$, $Q \triangleq \text{diag}\{Q_b, Q_r\} > 0$, $Q=Q_r$, $\gamma > 0$, $0 < \tau < 1$, $0 < \theta < 1$, $\sigma_1 > 0$, $\sigma_2 > 0$, $\gamma$, $\tau$, $\theta$, $\sigma_1$ and $\sigma_2$ are given coefficients, and $d^T$ is a transposed matrix of d;

$$\begin{cases} \Delta A(t) = G_1 \nabla H_1 \\ \Delta B(t) = G_2 \nabla H_2 \end{cases}, |\nabla| < I$$

also exists, I is an identity matrix; $H_1=H_2$ and is an identity matrix in an appropriate dimension; and $G_1=A*ts$, $G_2=B*ts$, where ts is a sampling time; and if there is a positive definite matrix $Q_b$, $Q_r$, J, $$K_p=(k_1,k_2)=JQ^{-1} \quad (6)$$

can be calculated.

The present invention further provides an apparatus for precise control of a position of a servo motor based on space-time two-dimensional optimization, applying the method for precise control of a position of a servo motor based on space-time two-dimensional optimization, including:
targeting either one of an angle or a displacement of the motor as a target value;
a data acquiring module, used for obtaining a set value and a feedback value of the target value;
a controller, used for based on the set value and the feedback value of the target value, performing processing by a control algorithm integrating a time dimension and a space dimension to obtain an output of the target value at a time t in a k dimension; and
performing corresponding control on the motor based on the output of the target value at the time t in the k dimension.

The present invention further provides a computer-readable storage medium, the computer-readable storage medium storing a computer program, where the steps of the method for precise control of a position of a servo motor based on space-time two-dimensional optimization are implemented when the computer program is executed by a processor.

The present invention has the beneficial effects:

The present invention proposes a method for precise control of a position of a servo motor based on space-time two-dimensional optimization. For the position or the angle of the servo motor, processing is performed by using the control algorithm based on time and space two-dimensional simultaneous optimization, which can achieve fast and precise comprehensive control. On one hand, the output of the motor can quickly and accurately follow the input value, on the other hand, even if disturbance exists during operation, a precise following state can still be recovered, and thus the method has strong robustness. The present invention can avoid the shortcomings of low optimization efficiency and low performance in the prior art.

BRIEF DESCRIPTION OF DRAWINGS

The above and other features of the present invention will become more apparent through detailed description of implementations presented in conjunction with the accompanying drawings, in which, the same reference numerals denote the same or similar parts. Apparently, the accompanying drawings in the following description only show some embodiments of the present invention, and those of ordinary skill in the art may further derive other accompanying drawings from these accompanying drawings without creative labor. In FIGs..

DETAILED DESCRIPTION OF THE EMBODIMENTS

Figure 1:
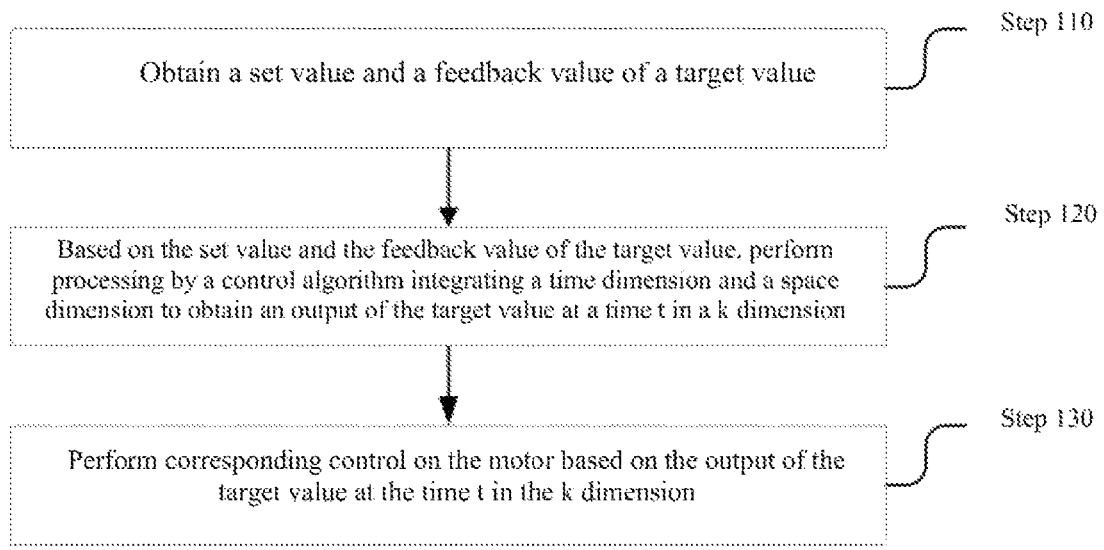
FIG. 1 shows a flowchart of a method for precise control of a position of a servo motor based on space-time two-dimensional optimization of the present invention.

The following will provide a clear and complete description of the concept, specific structure, and technical effects of the present invention in conjunction with embodiments and accompanying drawings, in order to fully understand the purpose, scheme, and effects of the present invention. It should be noted that, without conflict, the embodiments of the present application and the features in the embodiments can be combined with each other. The same reference numerals used in FIGs. denote the same or similar parts.

Figure 2:
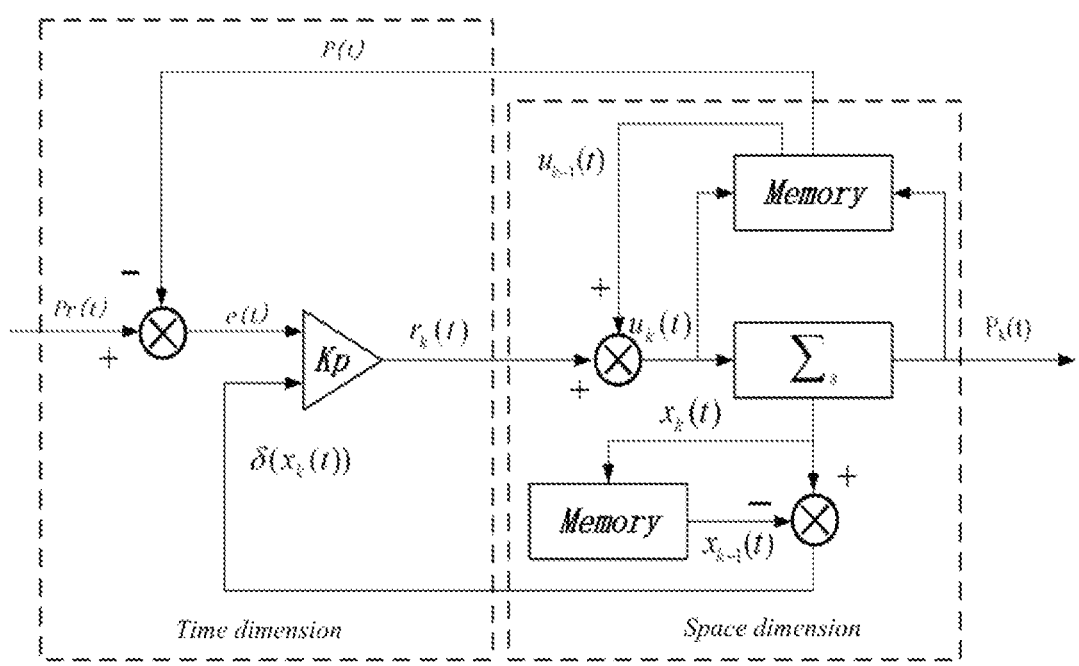
FIG. 2 shows a block diagram of an algorithm principle of a control algorithm that integrates a time dimension and a space dimension mentioned in the method for precise control of a position of a servo motor based on space-time two-dimensional optimization of the present invention.
Figure 3:
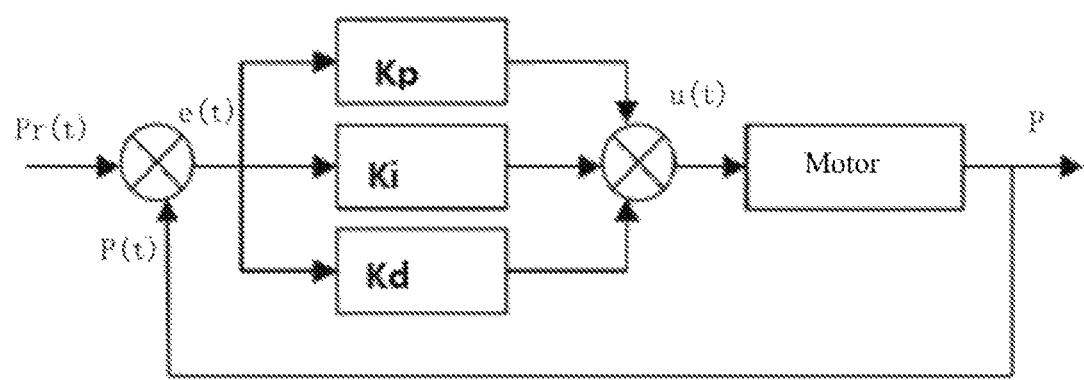
FIG. 3 shows a block diagram of an algorithm principle of a classic PID control algorithm mentioned in the background art of the present invention.

Referring to FIG. 1 and FIG. 2, according to embodiment 1, the present invention provides a method for precise control of a position of a servo motor based on space-time two-dimensional optimization, including the following steps:

targeting either one of an angle or a displacement of the motor as a target value;

step 110, obtaining a set value and a feedback value of the target value;

step 120, based on the set value and the feedback value of the target value, performing processing by a control algorithm integrating a time dimension and a space dimension to obtain an output of the target value at a time t in a k dimension; and step 130, performing corresponding control on the motor based on the output of the target value at the time t in the k dimension.

In the embodiment 1, for the position or the angle of the servo motor, processing is performed by using the control algorithm based on time and space two-dimensional simultaneous optimization, which can achieve fast and precise comprehensive control. On one hand, the output of the motor can quickly and accurately follow input value, on the other hand, even if disturbance exists during operation, a precise following state can still be recovered, and thus the method has strong robustness. The present invention can avoid the shortcomings of low optimization efficiency and low performance in the prior art.

As a preferred implementation of the present invention, specifically, based on the set value and the feedback value of the target value, performing processing by a control algorithm integrating a time dimension and a space dimension to obtain an output of the target value at a time t in a k dimension includes:

performing processing by the control algorithm in the time dimension, including:

defining e(t) as a following error of the target value, $$e(t) = Pr(t) - P(t) \quad (1),$$

where Pr(t) is the set value of the target value, and P(t) is the feedback value of the target value;

calculating a control rate $r_k(t)$ at the time t in the k dimension based on the following error e(t) of the target value and a state deviation $\delta(x_k(t))$ of the target value at the time t in the k dimension and a k−1 dimension, $$r_k(t) = (k_1 \quad k_2)\begin{pmatrix} \delta(x_k(t)) \\ e(t) \end{pmatrix}, \quad (2)$$

where a control rate gain is defined by a two-dimensional matrix $K_p = (k_1, k_2)$, $$\delta(x_k(t)) = x_k(t) - x_{k-1}(t) \quad (3)$$

$x_k(t)$ is a state of the target value at the time t in the k dimension, and $x_{k-1}(t)$ is a state of the target value at the time t in the k−1 dimension, which are read by a memory, and the memory is used for storing a state value and an output value of the previous dimension;

performing processing by the control algorithm in the space dimension, including:

calculating an output $u_k(t)$ of a controller at the time t in the k dimension, $$u_k(t) = u_{k-1}(t) + r_k(t) \quad (4)$$

where $u_{k-1}(t)$ is an output of the controller at the time t in the k−1 dimension, and is read by the memory, inputting $u_k(t)$ into a motor mechanism model $\Sigma_s$ to obtain an output $P_k(t)$ of the target value at the time t in the k dimension, $$\Sigma_s : \begin{cases} \dot{x}_k(t) = (A + \Delta A(t))x_k(t) + (B + \Delta B(t))u_k(t) + d(t) \\ P_k(t) = Cx_k(t), 0 \le t, \le T_p, k = 1, 2, 3, \ldots n \end{cases},$$

where A, B, and C are electrical coefficients of the motor, and can be obtained by measuring or consulting a motor manual, and $\Delta A(t)$ and $\Delta B(t)$ are changes in the electrical coefficients of the motor; d(t) is an external disturbance; and $T_p$ represents an operating cycle time of the motor in the space dimension, by using simultaneous equations (1)-(4), an output $u_k(t)$ of the controller of the motor can be calculated, and the target value of the motor can be controlled to quickly follow the set value.

As a preferred implementation of the present invention, specifically, an operating time $T_p$ of the motor in a periodic direction is determined as follows:

firstly, defining $T_p$ as a time required for the motor to operate by one circle, namely 360 degrees or $2\pi$, where the following relationship exists:

$$2\pi = \int_0^{T_p} v_k(t) dt,$$

where $v_k(t)$ represents an operating speed of the motor, and therefore, $T_p$ can be calculated.

As a preferred implementation of the present invention, specifically, a control rate gain parameter Kp is determined as follows:

according to the following matrix inequality equation:

$$\begin{pmatrix} -Q(\tau, \theta) & (AQ+BJ)^T & (H_1Q)^T & (H_2J)^T & (CQ)^T & 0 \\ AQ+BJ & -Q+\sigma_1 G_1 G_1^T + \sigma_2 G_2 G_2^T & 0 & 0 & 0 & d \\ H_1 Q & 0 & -\sigma_1 I & 0 & 0 & 0 \\ H_2 J & 0 & 0 & -\sigma_2 I & 0 & 0 \\ CQ & 0 & 0 & 0 & -\gamma I & 0 \\ 0 & d^T & 0 & 0 & 0 & -\gamma I \end{pmatrix} \quad (5)$$

$$< 0,$$

in the equation, d=d(t), $-Q(\tau, \theta) \triangleq \text{diag } \{\tau Q_b, \theta Q_t\} > 0$, $Q \triangleq \text{diag}\{Q_b, Q_t\} > 0$, $Q = Q_t$, $\gamma > 0$, $0 < \tau < 1$, $0 < \theta < 1$, $\sigma_1 > 0$, $\sigma_2 > 0$, $\gamma$, $\tau$, $\theta$, $\sigma_1$ and $\sigma_2$ are given coefficients, and $d^T$ is a transposed matrix of d;

$$\begin{cases} \Delta A(t) = G_1 \nabla H_1 \\ \Delta B(t) = G_2 \nabla H_2 \end{cases}, |\nabla| < I$$

also exists, I is an identity matrix; $H_1 = H_2$ and is an identity matrix in an appropriate dimension; and $G_1 = A*ts$, $G_2 = B*ts$, where ts is a sampling time; and if there is a positive definite matrix $Q_b$, $Q_t$, J, $$Kp = (k_1, k_2) = JQ^{-1} \quad (6)$$

can be calculated.

Figure 4:
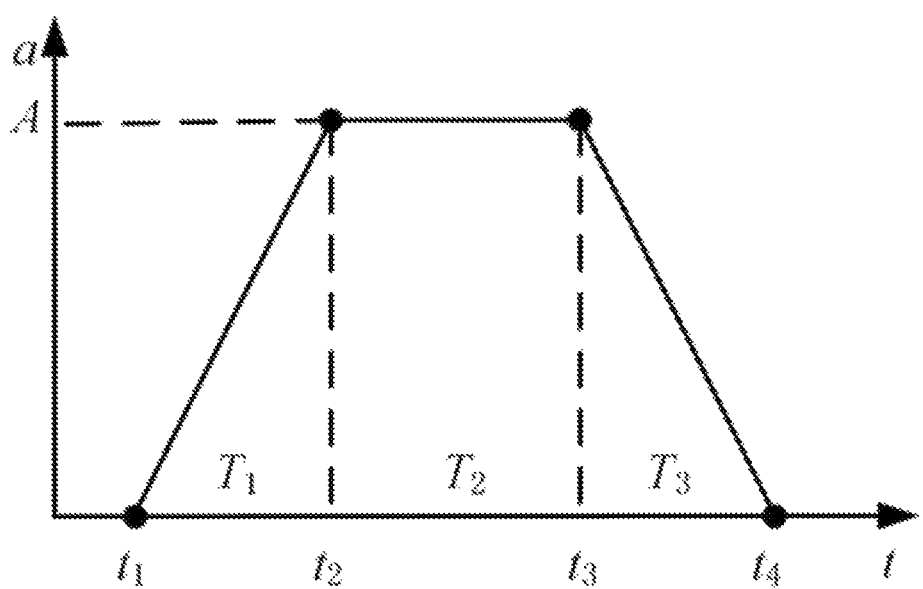
FIG. 4 shows a relationship diagram between speed and time of a motor during operation in a specific example of the method for precise control of a position of a servo motor based on space-time two-dimensional optimization of the present invention.

In an application example, assuming a given motor mechanism equation is as follows:

$$\dot{x}_k(t) = (-1.23 + \Delta A(t))x_k(t) + (1.68 + \Delta B(t))u_k(t) + d(t) P_k(t) = x_k(t),$$

$$0 \le t \le T_p, k = 1, 2, 3, \ldots n,$$

the set value: Pr=1×2π, that is the motor turns by 10 circles;
given parameters are as follows:
τ=θ=0.868, γ=0.9, σ1=σ2=0.1;
according to equations (5) and (6), it can be calculated that:

$K_p$=(0.6386,0.6835)

determining Tp needs to be divided into three stages: a starting acceleration stage, a constant speed stage, and a deceleration stop stage, where an operating speed of the motor is as follows:

with respect to the starting acceleration stage (as shown in T1 in FIG. 4): an acceleration angle range is set to one circle, that is, the motor accelerates from zero to maximum speed $v_k(t)$ within one circle, then:

$T_p=2\times 2\pi/v_k(t)$;

with respect to the constant speed stage (as shown in T2 in FIG. 4): the motor operates at a maximum speed $v_k(t)$ (corresponding to a scale line A), then:

$T_p=2\pi/v_k(t)$, with respect to the deceleration stop stage (as shown in T3 in FIG. 4): a deceleration angle range of the motor is one circle, that is, the motor decelerates from the maximum speed $v_k(t)$ to zero within one circle, then:

$T_p=2\times 2\pi/v_k(t)$;

based on the above derivation, a two-dimensional controller of the motor can be derived as follows:

$$u_k(t) = u_{k-1}(t) + \begin{pmatrix} 0.6386 & 0.6835 \end{pmatrix} \begin{pmatrix} \delta(x_k(t)) \\ e(t) \end{pmatrix}; \quad (7)$$

equations (1) and (3) are substituted into equation (7) to obtain an executable controller.

Figure 5:
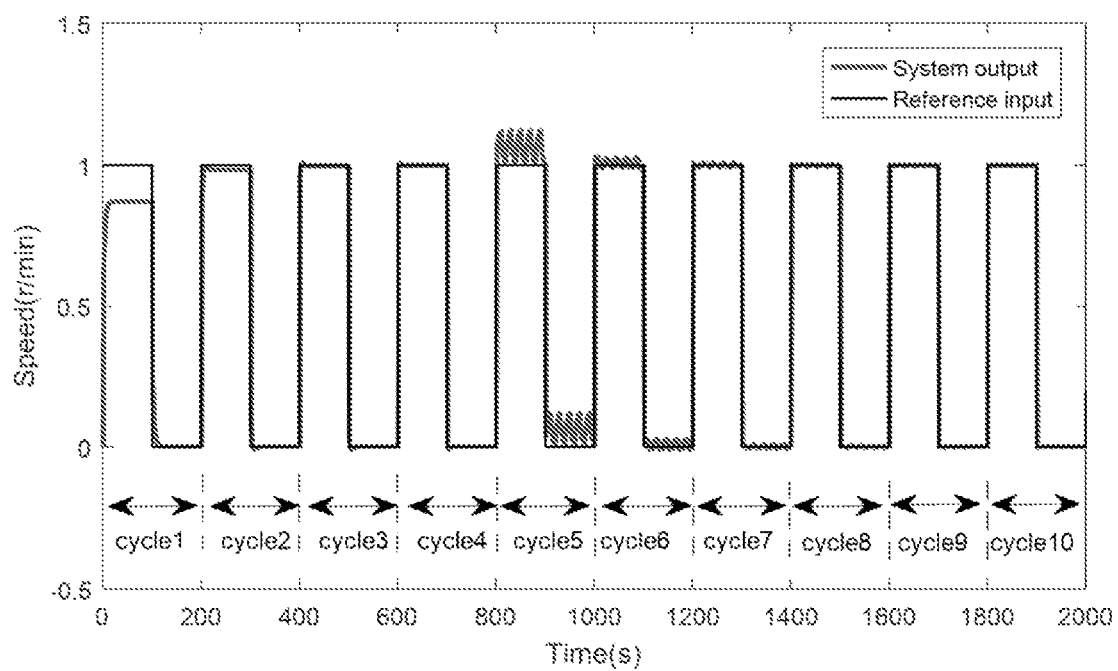
FIG. 5 shows a relationship diagram between angular displacement of a motor and time in a specific example of the method for precise control of a position of a servo motor based on space-time two-dimensional optimization of the present invention.

Combining with FIG. 5 corresponding to the application example, it can be clearly seen that the control output not only includes information on the following error e(t) in the time dimension of a traditional controller, but also includes information $\delta(x_k(t))$ on the following error in the space dimension. That is, a control system can optimize control performance of the motor along both the time dimension and the space dimension simultaneously. Therefore, from the above implementation diagram, it can be seen that the output of the motor completes starting in a first cycle (cycle 1) and accurately follows the input value in a second cycle (cycle 2), thereby realizing the beneficial effect of fast and accurate control.

In addition, in FIG. 5, external interference is applied during the constant speed operation stage of the motor, as shown in the figure in the 5th cycle (cycle 5). However, after 2 circles of adjustment, the motor returns to the precise following state in the 7th cycle (cycle 7). It can be seen that a control strategy integrating the time dimension and the space dimension, proposed by the present invention, has strong robustness.

The present invention further provides an apparatus for precise control of a position of a servo motor based on space-time two-dimensional optimization, applying the method for precise control of a position of a servo motor based on space-time two-dimensional optimization, including:

targeting either one of an angle or a displacement of the motor as a target value;

a data acquiring module, used for obtaining a set value and a feedback value of the target value;

a controller, used for based on the set value and the feedback value of the target value, performing processing by a control algorithm integrating a time dimension and a space dimension to obtain an output of the target value at a time t in a k dimension; and performing corresponding control on the motor based on the output of the target value at the time t in the k dimension.

The present invention further provides a computer-readable storage medium, the computer-readable storage medium storing a computer program, where the steps of the method for precise control of a position of a servo motor based on space-time two-dimensional optimization are implemented when the computer program is executed by a processor.

Modules mentioned above as separate components can be, or may not be physically separated, and components shown as a module can be, or may not be a physical module, that is the components can be located in one place or distributed across multiple network modules; and some or all of the modules can be selected according to actual needs to achieve the purpose of the scheme in the present embodiment.

In addition, functional modules in various embodiments of the present invention can be integrated into one processing module, or each module physically exists separately, or two or more modules are integrated into one module. The integrated modules mentioned above can be implemented in both hardware and software functional modules.

If the integrated modules of the present invention are implemented in the form of software functional modules and sold or used as independent products, they can also be stored in one computer-readable storage medium. Based on such understanding, the present invention implements all or part of the processes of the method in the embodiments, and can also be completed by instructing relevant hardware through computer programs. The computer programs can be stored in a computer-readable storage medium, and can implement the steps of the various method embodiments when executed by the processor. Herein, the computer program includes computer program codes, which can be in a form of source codes, object codes, executable files, or some intermediate forms, etc. The computer-readable medium can include: any entity or system capable of carrying the computer program codes, a recording medium, a USB flash drive, a mobile hard disk, a magnetic disc, an optical disc, a computer memory, a read-only memory (ROM), a random access memory (RAM), an electrical carrier signal, a telecommunications signal, a software distribution medium, etc.

Although the description of the present invention is quite detailed and specifically describes several embodiments, it is not intended to be limited to any of these details or embodiments or any special embodiments, but should be regarded as providing a broad possible interpretation of the claims by referring to the attached claims and considering the prior art, thereby effectively covering the predetermined scope of the present invention. In addition, the present invention is described in the preceding text with foreseeable embodiments by the inventor, with the aim of providing useful description, while non substantial modifications to the present invention that have not yet been foreseen can still represent equivalent modifications of the present invention.

The above is only preferred embodiments of the present invention, and the present invention is not limited to the above implementations. As long as an implementation realizes the technical effects of the present invention by the same means, it should fall within the scope of protection of the present invention. The present invention may have various modifications and variations in its technical solutions and/or implementations within its scope of protection.

What is claimed is:

1. A method for precise control of a position of a servo motor based on space-time two-dimensional optimization comprising the following steps:
   targeting either one of an angle or a displacement of the servo motor as a target value;
   obtaining a set value and a feedback value of the target value;
   based on the set value and the feedback value of the target value, performing processing by a control algorithm integrating a time dimension and a space dimension to obtain an output of the target value at a time t in a k dimension;
   wherein specifically, based on the set value and the feedback value of the target value, performing processing by the control algorithm integrating the time dimension and the space dimension to obtain the output of the target value at the time t in the k dimension comprises:
   performing processing by the control algorithm in the time dimension, including:
   defining e(t) as a following error of the target value, $$e(t) = Pr(t) - P(t) \quad (1)$$

wherein Pr(t) is the set value of the target value, and P(t) is the feedback value of the target value;
   calculating a control rate $r_k(t)$ at the time t in the k dimension based on the following error e(t) of the target value and a state deviation $\delta(x_k(t))$ of the target value at the t time in the k dimension and a k−1 dimension, $$r_k(t) = (k_1 \ k_2)\begin{pmatrix} \delta(x_k(t)) \\ e(t) \end{pmatrix}, \quad (2)$$

wherein a control rate gain is defined by a two-dimensional matrix $K_p = k_1, k_2$), $$\delta(x_k(t)) = x_k(t) - x_{k-1}(t) \quad (3)$$

$x_k(t)$ is a state of the target value at the time t in the k dimension, and $x_{k-1}(t)$ is a state of the target value at the time t in the k−1 dimension, which are read by a memory, and the memory is used for storing a state value and an output value of the previous dimension;
   performing processing by the control algorithm in the space dimension, including:
   calculating an output $u_k(t)$ of a controller at the time t in the k dimension;

$$u_k(t) = u_{k-1}(t) + r_k(t) \quad (4)$$

wherein $u_{k-1}(t)$ is an output of the controller at the time t in the k−1 dimension, and is read by the memory,
   inputting $u_k(t)$ into a motor mechanism model $\Sigma_s$ to obtain an output $P_k(t)$ of the target value at the time t in the k dimension, $$\Sigma_s : \begin{cases} x_k(t) = (A + \Delta A(t))x_k(t) + (B + \Delta B(t))u_k(t) + d(t) \\ P_k(t) = Cx_k(t), 0 \le t, \le T_p, k = 1, 2, 3, \ldots n \end{cases},$$

wherein A, B, and C are electrical coefficients of the servo motor, $\Delta A(t)$ and $\Delta B(t)$ are changes in the electrical coefficients of the servo motor; d(t) is an external disturbance; and $T_p$ represents an operating cycle time of the servo motor in the space dimension, using the simultaneous equations (1)-(4), an output $u_k(t)$ of the controller of the servo motor is calculated, and the target value of the servo motor is controlled to follow the set value, and
   performing control of the servo motor based on a calculated output of the target value at the time t in the k dimension.

2. The method for precise control of a position of a servo motor based on space-time two-dimensional optimization according to claim 1, wherein specifically, an operating time $T_p$ of the servo motor in a periodic direction is determined as follows:
   firstly, defining $T_p$ as a time required for the servo motor to operate by one circle, namely 360 degrees or $2\pi$, wherein the following relationship exists:

$$2\pi = \int_0^{T_p} v_k(t)dt,$$

wherein $v_k(t)$ represents an operating speed of the servo motor, and therefore, $T_p$ can be calculated.

3. The method for precise control of a position of a servo motor based on space-time two-dimensional optimization according to claim 1, wherein specifically, a control rate gain parameter Kp is determined as follows:
   according to the following matrix inequality equation:

$$\begin{pmatrix} -Q(\tau, \theta) & (AQ+BJ)^T & (H_1Q)^T & (H_2J)^T & (CQ)^T & 0 \\ AQ+BJ & -Q+\sigma_1 G_1 G_1^T + \sigma_2 G_2 G_2^T & 0 & 0 & 0 & d \\ H_1Q & 0 & -\sigma_1 I & 0 & 0 & 0 \\ H_2J & 0 & 0 & -\sigma_2 I & 0 & 0 \\ CQ & 0 & 0 & 0 & -\gamma I & 0 \\ 0 & d^T & 0 & 0 & 0 & -\gamma I \end{pmatrix} \quad (5)$$

$$< 0,$$

in the equation, d=d(t), $-Q(\tau, \theta) \triangleq \text{diag} \{\tau Q_b, \theta Q_t\} > 0$, $Q \triangleq \text{diag}\{Q_b, Q_t\} > 0$, $Q = Q_t$, $\gamma > 0$, $0 < \tau < 1$, $0 < \theta < 1$, $\sigma_1 > 0$, $\sigma_2 > 0$, $\gamma$, $\tau$, $\theta$, $\sigma_1$ and $\sigma_2$ are given coefficients, and $d^T$ is a transposed matrix of d;

$$\begin{cases} \Delta A(t) = G_1 \nabla H_1 \\ \Delta B(t) = G_2 \nabla H_2 \end{cases}, |\nabla| < I$$

also exists, I is an identity matrix; $H_1 = H_2$ and is an identity matrix in an appropriate dimension; and $G_1 = A*ts$, $G_2 = B*ts$, where ts is a sampling time; and if there is a positive definite matrix $Q_b$, $Q_t$, J, $$K_p = (k_1, k_2) = JQ^{-1} \quad (6)$$

can be calculated.

4. An apparatus for precise control of a position of a servo motor based on space-time two-dimensional optimization, applying the method for precise control of a position of a servo motor based on space-time two-dimensional optimization according to claim 1, comprising:
   targeting either one of the angle or the displacement of the servo motor as the target value;
   obtaining set value and feedback value of the target value;
   controller used for, based on the set value and the feedback value of the target value, performing processing by the control algorithm integrating the time dimension and the space dimension to obtain the output of the target value at the time t in the k dimension; and performing corresponding control on the servo motor based on the output of the target value at the time t in the k dimension.

5. A non-transitory computer-readable storage medium, the non-transitory computer-readable storage medium storing a computer program, wherein the steps of the method according to claim 1 are implemented when the computer program is executed by a processor.

* * * * *